S. C. SHELTON.
Tobacco-Hanger.
No. 161,828. Patented April 6, 1875.
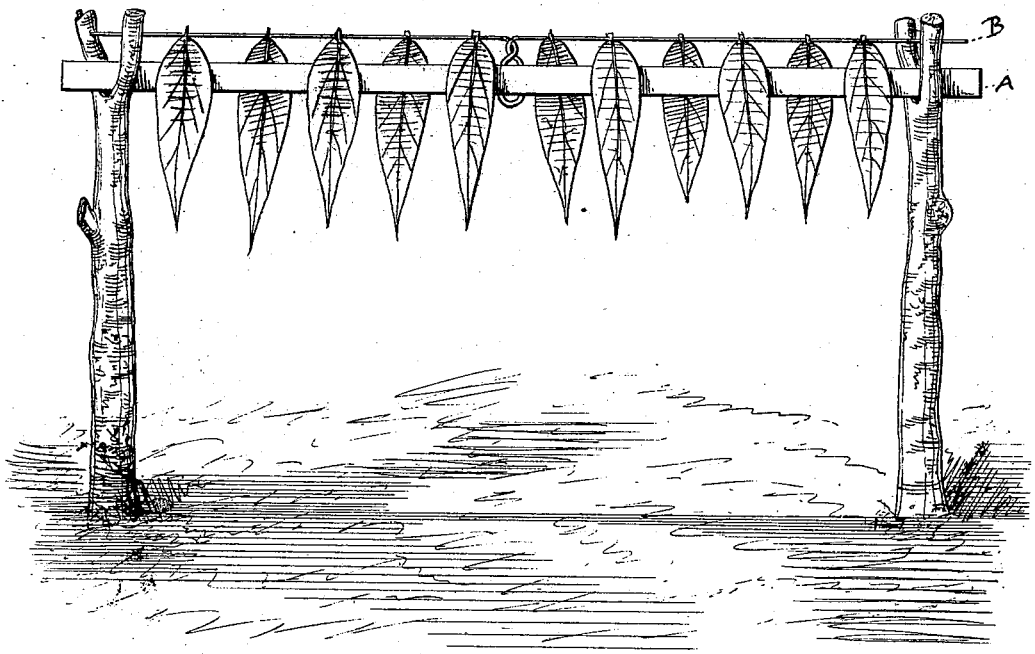
Witnesses:
D. W. Fyrman
J. E. Reed
Inventor:
Samuel C. Shelton

UNITED STATES PATENT OFFICE.

SAMUEL C. SHELTON, OF ASHEVILLE, NORTH CAROLINA.

IMPROVEMENT IN TOBACCO-HANGERS.

Specification forming part of Letters Patent No. 161,828, dated April 6, 1875; application filed March 8, 1875.

*To all whom it may concern:*

Be it known that I, SAMUEL C. SHELTON, of Asheville, Buncombe county, State of North Carolina, have invented a new Improvement in Curing Tobacco, which makes a large saving to the planter in labor and expense in said process; and I do hereby declare that the following, taken in connection with the drawing which accompanies and forms a part of this specification, is a full, clear, and exact description of my invention, and of the construction and operation of said invention, sufficient to enable those skilled in the art to make and use the same.

The object of my invention is to construct a device upon which tobacco may be cured, without cutting the stalk or tying the leaves in any manner whatever.

The drawing shows my stick or hanger, on which is shown tobacco leaves in process of curing.

I take a bar or beam of any suitable size and form, and at or near its center I secure the rods or wires B, which are bent in reverse directions, and may be sharpened at the end, so that the leaves, after being stripped from the stalk, may be strung or threaded or stuck on the wires.

I string the leaves on alternate sides of the beam—that is to say, I first string one leaf and move it along toward the center of the bar or beam and allow it to hang on one side, and then stick or string the next leaf and allow it to hang to the opposite side, and so on until the rods are filled. The thickness of the beam keeps the leaves apart, and allows the air and heat to pass between the leaves, which greatly facilitates the process of curing.

It will be seen that in the use of my device I manipulate the leaves separately, the stripping being done before curing, and thus much labor and material saved in the use of my hanger in the curing process.

In thus describing my invention, I have exhibited only one style of hanger, but propose at some future time to apply for other patents for improvements which will embrace a variety of revolving beams or bars, and modes of attaching the rods or wires on which the leaves are strung.

Having thus described my invention, I claim—

A tobacco-hanger, consisting of the beam or bar A, and rods or wires B secured thereto, substantially in the manner and for the purpose specified.

SAMUEL C. SHELTON.

Witnesses:
J. E. REED,
SAMUEL MERRELL.